(12) United States Patent
Beyer et al.

(10) Patent No.: US 9,471,770 B2
(45) Date of Patent: Oct. 18, 2016

(54) METHOD AND CONTROL UNIT FOR RECOGNIZING MANIPULATIONS ON A VEHICLE NETWORK

(75) Inventors: Ralf Beyer, Moerendorf (DE); Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/117,877

(22) PCT Filed: May 15, 2012

(86) PCT No.: PCT/EP2012/059051
§ 371 (c)(1),
(2), (4) Date: Nov. 15, 2013

(87) PCT Pub. No.: WO2012/159940
PCT Pub. Date: Nov. 29, 2012

(65) Prior Publication Data
US 2014/0107875 A1    Apr. 17, 2014

(30) Foreign Application Priority Data
May 24, 2011    (DE) ........................ 10 2011 076 350

(51) Int. Cl.
| | |
|---|---|
| *G06F 21/44* | (2013.01) |
| *B61L 15/00* | (2006.01) |
| *G06F 21/51* | (2013.01) |
| *G06F 21/64* | (2013.01) |
| *H04L 9/32* | (2006.01) |

(52) U.S. Cl.
CPC ........... *G06F 21/44* (2013.01); *B61L 15/0036* (2013.01); *B61L 15/0072* (2013.01); *G06F 21/51* (2013.01); *G06F 21/64* (2013.01); *H04L 9/3231* (2013.01); *G06F 2221/2105* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 6,308,272 | B1 * | 10/2001 | Pearce | ............................ 726/22 |
| 6,513,120 | B2 * | 1/2003 | Kanzawa et al. | ............... 726/17 |
| 6,694,235 | B2 | 2/2004 | Akiyama | |
| 7,894,978 | B2 | 2/2011 | Kurnik et al. | |
| 8,103,869 | B2 | 1/2012 | Balandin et al. | |

(Continued)

FOREIGN PATENT DOCUMENTS

| | | |
|---|---|---|
| CN | 101281409 A | 10/2008 |
| CN | 101559745 A | 10/2009 |

(Continued)

*Primary Examiner* — Michael R Vaughan
(74) *Attorney, Agent, or Firm* — Laurence Greenberg; Werner Stemer; Ralph Locher

(57) ABSTRACT

A method for detecting manipulation of at least one vehicle network of a vehicle includes determining a digital fingerprint of the at least one vehicle network, comparing the digital fingerprint of the at least one vehicle network to reference information, adapting a function of the at least one vehicle network as a function of a result of the comparison, such that operational safety is ensured, and activating a regular control mode if no manipulation of the at least one vehicle network is detected, or activating an operationally safe control mode if manipulation of the at least one vehicle network is detected. A control unit for detecting manipulation of at least one vehicle network of a vehicle carries out control tasks as a function of a result of a comparison of a digital fingerprint of at least one vehicle network to reference information of a control network.

28 Claims, 2 Drawing Sheets

(56) References Cited

U.S. PATENT DOCUMENTS

| | | |
|---|---|---|
| 8,433,790 B2 * | 4/2013 | Polley et al. ............... 709/224 |
| 8,844,041 B1 * | 9/2014 | Kienzle et al. ............... 726/25 |
| 2005/0076246 A1 | 4/2005 | Singhal |
| 2006/0037075 A1 * | 2/2006 | Frattura ............ H04L 12/2602 726/22 |
| 2006/0180709 A1 | 8/2006 | Breton et al. |
| 2007/0121596 A1 | 5/2007 | Kurapati et al. |
| 2007/0174608 A1 | 7/2007 | Balandin et al. |
| 2008/0095058 A1 * | 4/2008 | Dalmases ............ H04L 45/00 370/237 |
| 2008/0178293 A1 * | 7/2008 | Keen ............ H04L 41/12 726/23 |
| 2009/0235354 A1 * | 9/2009 | Gray et al. ............... 726/22 |
| 2010/0325730 A1 * | 12/2010 | Cyprus et al. ............... 726/25 |
| 2010/0332630 A1 * | 12/2010 | Harlow ............ H04L 12/2697 709/221 |
| 2014/0012425 A1 * | 1/2014 | Huhmann ............ H02K 19/103 700/286 |
| 2014/0053286 A1 * | 2/2014 | Adams et al. ............... 726/34 |

FOREIGN PATENT DOCUMENTS

| | | |
|---|---|---|
| DE | 19708314 A1 | 9/1998 |
| DE | 10230351 A1 | 1/2003 |
| DE | 102006006109 A1 | 8/2007 |
| DE | 102009007171 A1 | 9/2009 |
| WO | 2007083278 A1 | 7/2007 |
| WO | 2007090712 A1 | 8/2007 |

* cited by examiner

METHOD AND CONTROL UNIT FOR RECOGNIZING MANIPULATIONS ON A VEHICLE NETWORK

BACKGROUND OF THE INVENTION

Field of the Invention

The invention relates to monitoring of information security or integrity in order to maintain safety and in order to maintain security in order to protect against damage through manipulation.

Ethernet-based or IP-based data transmission is used increasingly in order to perform control and monitoring tasks. Thus, various vehicles, particularly rail vehicles, have data networks in order to perform the vehicle control, and also for further operator functions.

The precise proper execution of control and monitoring tasks in a vehicle or in a rail vehicle in a train requires the control network and the control components connected by means of the latter, such as control computers, subsystems or field components with sensors and actuators, to function properly. In the event of manipulations on the control network, this is not ensured, however, since transmission control and measurement data can be altered. This adversely affects proper operation. In some circumstances, functions that are required for the safety of the vehicle can no longer be performed properly.

Protective measures for vehicle networks are known in various forms. Thus, control networks can be installed with access protection. By way of example, this occurs in special cable ducts, which means that they are not accessible to an outsider and manipulations can therefore be prevented. This is costly, however, and cannot be implemented on a general basis on account of the complex installation and performance of maintenance work. Simple, physical protective measures are relatively simple to bypass, for example when it is only necessary to remove or unscrew a cover.

Control networks usually have self-contained logic, i.e. are not or not directly connected to external networks. What is known as a "firewall" can limit at least the data traffic in a sense that data are selected that can be interchanged with external networks. This means that a network-based attack from the outside is not possible or is possible only in a complex manner.

The measures described do not set up protection against manipulations on the vehicle, however, which means that data within a vehicle network can in fact be manipulated.

It is also known practice to protect data during transmission using a checksum, such as a "CRC value/cyclic redundancy check". These checksums are suitable only for recognizing random transmission errors. This therefore does not achieve protection against intentional manipulation, since the attacker can easily calculate the valid CRC value for the data that he manipulates.

Similarly, cryptographic checksums are known, such as a "message authentication code" or "digital signature". In this case, transmitted data, for example control data for a vehicle, are augmented by a cryptographic checksum during transmission. This checksum is checked upon reception. Only correctly checked data are processed further. By way of example, the communication can be encrypted using "MACsec", "IPsec" or "SSL/TLS". In this case, the transmitted data are protected by a cryptographic checksum. Cryptographic protection of this kind can be implemented only with complexity subsequently, in the form of integration into automation components. A separate encryption front-end component is similarly complex.

Furthermore, the calculation and checking of a cryptographic checksum leads to a delay on account of the computationally complex cryptographic operations, which is undesirable particularly in the case of realtime-critical control and regulatory tasks.

In addition, what are known as "intrusion detection systems" are known that monitor the network traffic that occurs. In the case of "suspicious" network traffic, an alarm is triggered. Known attack patterns, what are known as attack signatures, in the network traffic can be recognized in this case. However, This allows only specific, already known attacks to be recognized. Heuristic methods, such as the recognition of a significant alteration in statistical variables that describe the network traffic, also attempt to recognize hitherto unknown attacks. This merely allows attacks to be recognized by evaluating a significant change in statistical characteristic values, such as the access duration or the frequency of use of a network service. In this case, it is easy to detect an alleged attack erroneously in the event of random fluctuations.

As a result, heuristic attack recognition methods that are based on the analysis of statistical characteristic values are unreliable and are at most used as a complement in practice.

Automatic topology recognition in the network is used to ascertain all the connected network devices, for example by means of "LLDP", "CDP", "SNMP" or "broadcast ping". "LLDP" can also ascertain the topology of the network cabling.

US 2006/0180709, entitled "Method and System for IP Train Inauguration", describes train inauguration that takes place in an IP-based train control network. In this case, the train topography, which is designed particularly for a follow-me vehicle, is ascertained by means of network recognition. This is taken as a basis for configuring the "routing" and the IP address conversion/NAT.

BRIEF SUMMARY OF THE INVENTION

The invention is based on the object of determining alterations on a vehicle network, particularly on that of a rail vehicle, and of preventing a threat to integrity, that is to say to safety and security.

This object is achieved by the respective combination of features of independently worded patent claims.

The invention is based on the insight that different manipulations or vandalism on a vehicle network that present(s) a threat to the correct performance of control functions on the vehicle can be recognized. If a safe status cannot be ensured, regular operation is not allowed.

Regular operation of a vehicle generally requires the integrity of the vehicle network. An alteration of intentional or unintentional type or caused by technical errors can occur at any time. Integrity comprises safety, protection against transmission errors and security, particularly protection against deliberate alteration.

Manipulation recognition on a vehicle, particularly a rail vehicle, occurs by virtue of a digital fingerprint from a vehicle network being ascertained and being compared with a stored piece of reference information. A digital fingerprint from a vehicle network characterizes the currently available configuration of the vehicle network, i.e. the number of connected network components, such as controllers, and/or a set of identification information from the connected network components. The identification information from a network component may be provided by its network address, such as MAC address, an IP address, or by its type and its serial number, for example. A digital fingerprint from a vehicle network may also comprise a piece of information that characterizes the network topology, i.e. that describes which network component is directly connected to which other network component(s), and via which interface. The result of the comparison is taken as a basis for customizing the control function of a control unit that is connected to the vehicle network under consideration, said control unit particularly being a control computer.

If there is a discrepancy for this comparison, the setup changes over to what is known as safety control or a safe state. Hence, in the event of a relevant manipulation on a vehicle network the manipulation recognition and the subsequent changeover to the safety control prevent damage to persons or damage to an installation/vehicle from being able to occur. In this case, safety functions that are available as standard can be used in order to counter a relevant incident or to limit the damage arising therefrom.

An ascertained piece of comparison information is checked against a stored piece of reference information in order to ascertain whether actual network configuration of the vehicle network corresponds to the reference information. In this way, manipulation on a vehicle network is recognized.

A substantial aspect is the recognition of a manipulation on the control network of a vehicle. By way of example, it is possible to recognize when an additional network device is connected to a vehicle network by virtue of the number of connected network components being higher than the stored reference value. It is also possible to recognize replacement of a network device by another network device from the different identification information of the network component. It is also possible to recognize reconnection of the cabling.

The comparison information or the reference information can be understood as a digital reference fingerprint from the vehicle network.

A "digital fingerprint" is respectively characteristic of an individual vehicle network 2.

A vehicle control performs regular control when the ascertained digital fingerprint from the control network used for controlling the vehicle matches a stored reference fingerprint. In the event of a discrepancy, the vehicle is operated restrictedly or deactivated in order to keep it in a safe state.

It is advantageous to use an Ethernet-based or IP-based vehicle network that is connected only to known components in accordance with fixed cabling. This means that it is a self-contained network with a fixed configuration. This applies to the case in which manipulation recognition has been performed on a vehicle control network to the extent that no discrepancy between the ascertained fingerprint from the control network and a stored reference fingerprint is detected. In line with the invention, a discrepancy from this fixed network configuration can easily be recognized during a comparison. It is advantageous to customize the vehicle control in the event of the occurrence of a discrepancy from the stored, fixed configuration. This allows erroneous control to be prevented even for an intentionally or inadvertently manipulated vehicle control network. The aim of preventing any threat to passengers is achieved thereby.

The performance of a comparison between "digital fingerprint" and a piece of reference information can be performed by a control unit, such as a control computer as part of a vehicle network, itself. In the same way, however, the result of the comparison can be supplied to a further control unit. This can be effected via the control network itself or via a separate control line.

The use of a programmable logic control unit is advantageous. This allows the actuation of air-conditioning installations, doors, drives, brakes, etc.

Particularly for a safe state for a vehicle, comparison or check results can be cryptographically protected during forwarding. This can be accomplished by what is known as a "message authentication code/MAC" or by a "digital signature", for example. Hence, this information is provided with a state in which it cannot be manipulated.

Advantageously, the check on the topological integrity of the network cabling can be used for manipulation recognition. Topological integrity is understood to mean that the network cable connection of the network interfaces of the network components connected to the vehicle control network is unaltered. Even if data communication is possible, incorrectly connected network cables mean that it is not possible to rule out a network overload, for example, on some network connections, or realtime-critical network control communication on a network connection on a network cable can be disturbed by further data communication that would not be present in the case of network cables connected as envisaged. In this case, a check is performed to determine whether the devices are wired as usual or whether components or network cables have been reconnected, for example. In addition, a check can be performed to determine whether regular devices are available and particular, unexpected devices are also actively not available. It is possible to check whether unused network ports are actually unused. In this case, it is possible to take into account that individual controllers can be switched off by a vehicle service. Hence, the absence of a component during the search for manipulations can immediately be classified as negative, i.e. as an inadmissible discrepancy.

In addition, it is advantageous to use physical sensors in order to monitor the network cabling. Thus, by way of example, components that are controlled digitally, that is to say only open or only closed, can be monitored.

In a further variant, physical transmission parameters are used for the evaluation. In this case, an impulse response from the network cabling is ascertained and is compared with a reference value. A manipulation in the form of substitution of a network cable or in the form of a physical manipulation on a network cable can therefore be recognized.

It is also advantageous to use IP addresses or MAC addresses to identify extraneous devices or substitute devices. The components connected to the vehicle network are identified or authenticated. In this case, the device type thereof is ascertained according to criteria such as manufacturer, model, serial number, etc. Furthermore, cryptographic device authentication can take place. In this case, the authentication of connected devices is performed by means of a password, a cryptographic key or a digital device certificate. This check can be performed as part of the manipulation recognition itself, or communication that occurs during the authentication of a further component is monitored and analyzed by the manipulated recognition. In addition, test data can be transmitted by the vehicle network in order to verify the correct transmission of said test data.

A control unit is used to perform at least one control task on the basis of the result of the check on the control network. In this case, the functionality of a controller is enabled, restrictedly enabled or deactivated for operation. Deactivation can usually be understood to mean an inherently safe operating state of a vehicle. As a special service, an enable message can be sent to a controller. The effect achieved by this is that the installation does not change to an unsafe operating state even when manipulation of the control network is occurring. Restricted operation of the vehicle can take place, as with limited speed of travel or slow movement with caution.

Additional advantages arise from the use of a control computer when coupling a plurality of vehicle networks in order to limit the admissible communication on a network coupler/gateway. Usually, different vehicle subnetworks, such as a passenger network, an operator network or the like, are present that are normally completely decoupled from a vehicle network that is responsible for controlling the vehicle. In the course of the method for the recognition of manipulation, calculations can be incorporated in which additional criteria need to be met in order to continue operation of the vehicle. By way of example, it is thus possible to check that a network coupler/gateway with a firewall functionality actually truly prevents inadmissible communication between a vehicle control network and an operator network or passenger network connected via the network coupler/gateway. If such inadmissible communication is still possible, for example because the network cables to the network coupler/gateway are incorrectly connected or because the firewall functionally of the network coupler/gateway is not functioning properly, an error is detected, i.e. the manipulation recognition recognizes a discrepancy/manipulation.

In order to track error messages it is possible for an entry to be made in an error memory. This likewise applies to positive results of a check.

Advantages also arise in the event of data being transmitted to a land-based unit, for example via "WLAN" or a mobile radio network, such as "GSM", "GPRS", "UMTS", "WIMAX" or the like.

The method for the recognition of manipulation can be applied at different times and can be recalled regularly, constantly or optionally. By way of example, the method can be activated under the following conditions:
    upon termination of a maintenance mode for enabling operation,
    upon deactivation of the control function,
    upon startup of the vehicle,
    upon the user changing, in order to authenticate the new user,
    during ongoing operation.

A vehicle, particularly a rail vehicle, may have vehicle networks, for example in order to execute different vehicle network tasks or vehicle control tasks. The following can be cited in this context:
    the drive network,
    the brake network,
    the train protection network,
    the air-conditioning control network,
    the door control network,
    the passenger information network or
    the video monitoring network.

The monitoring can relate to a single one of these vehicle networks. It is also possible for a plurality of vehicle network tasks to be implemented on a vehicle network. Thus, by way of example, a drive network and a brake network may coincide. The individual vehicle networks may be connected by means of network couplers/gateways.

In a further variant, the integrity of a vehicle network is monitored and in the event of a discrepancy data communication with a vehicle network is prevented or restricted. If, for example, it is recognized that an operator network or a control network for air-conditioning control or lighting control, for example, differs from the known reference configuration, since a supplementary device or a maintenance device is connected to this vehicle network, a network coupler/gateway can be connected as a substitute to a further subnetwork, e.g. the control network or the brake network of the vehicle. Furthermore, data communication by the vehicle network under consideration with further networks can be restricted or prevented. This prevents changes in any vehicle network from having a threatening effect on the reliable operation of a further vehicle network.

It is particularly advantageous that a piece of reference information is not just able to be firmly prescribed but, in one variant, can also be taught. During maintenance of the vehicle in which a faulty controller is replaced, the fingerprint of the vehicle network also changes. So that operating personnel do not have to store the reference fingerprint explicitly, the currently available fingerprint of the vehicle network can be ascertained upon termination of the maintenance or upon termination of a vehicle maintenance mode and can be stored as a new reference fingerprint. This can be done by a controller in the vehicle or by a connected maintenance device, for example a maintenance notebook. In this case, the ascertained fingerprint can also be modified and the modified fingerprint can be stored as a reference fingerprint, for example in order to remove the information relating to the connected maintenance notebook from the reference fingerprint. During maintenance of vehicles or rail vehicles, it is thus possible to record and store the when the vehicle reference information is enabled for driving operation. In this case, this is possible only when a maintenance interface of the rail vehicle is used to effect authorized maintenance access.

BRIEF DESCRIPTION OF THE SEVERAL VIEWS OF THE DRAWING

Exemplary embodiments that do not restrict the invention are described below with reference to schematic figures.

DESCRIPTION OF THE INVENTION

Figure 1:
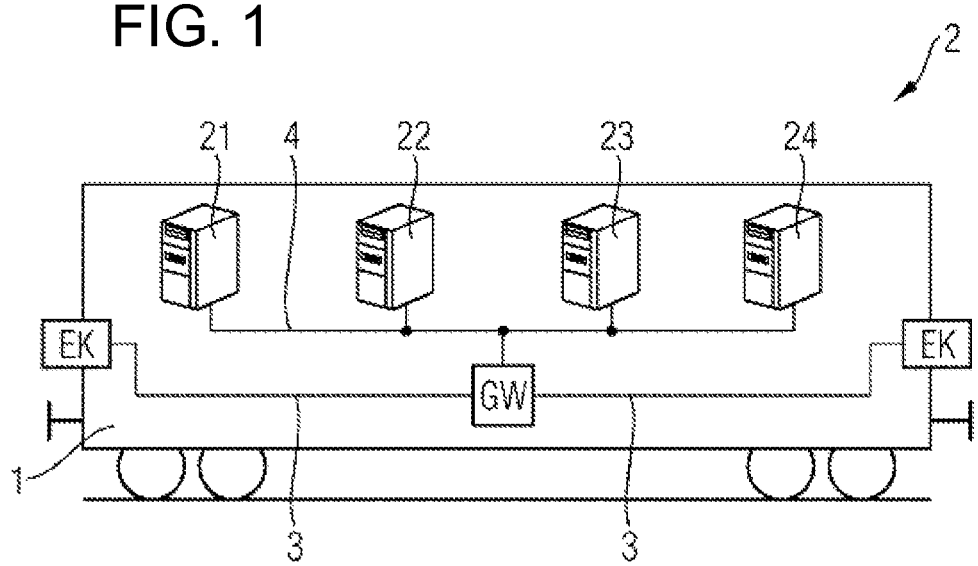
FIG. 1 shows a rail vehicle having a plurality of different vehicle networks 2, wherein a network coupler/gateway GW connects the vehicle networks 2 to a vehicle main network 3.
Figure 2:
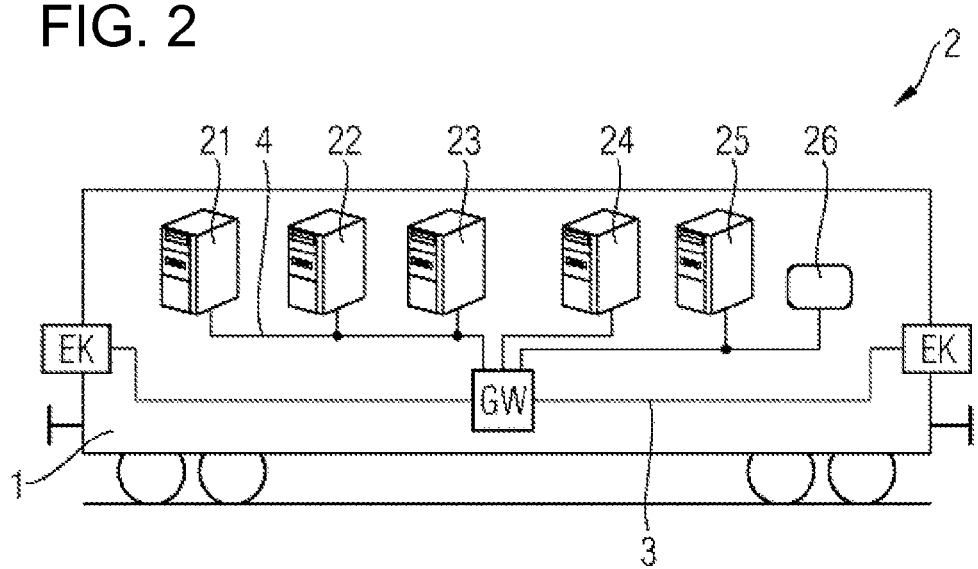
FIG. 2 shows a variant of FIG. 1, wherein the rail vehicle has a plurality of vehicle networks 2 that are connected to one another via a network coupler/gateway GW, and also are simultaneously coupled to the vehicle main network 3 via the network coupler/gateway GW.

FIGS. 1 and 2 each show a vehicle 1, particularly a rail vehicle, having a vehicle main network bus 3 that connects one or more electric couplings EK via a network coupler/gateway GW. The vehicle subnetworks 21 to 26 of the vehicle network 2 are connected among one another via a vehicle control network bus 4, as shown in FIG. 1, with a connection to the network coupler/gateway GW existing. The vehicle network 2 may be implemented particularly as an Ethernet network or as an IP network or as a combination thereof. FIG. 1 shows it as a bus via which the vehicle controllers or vehicle subnetworks 21-24 and the network coupler/gateway GW are connected. The vehicle network 2 or a group thereof may likewise be in the form of a ring or a star.

FIG. 2 shows a variant in which three vehicle control networks or three vehicle control subnetworks 21-23, and also 25-26, are respectively combined. The vehicle control subnetworks shown in FIG. 2 are therefore connected partly among one another and partly via the network coupler/gateway GW to one another individually and overall via the network coupler/gateway GW to the vehicle main network bus 3.

Figure 3:
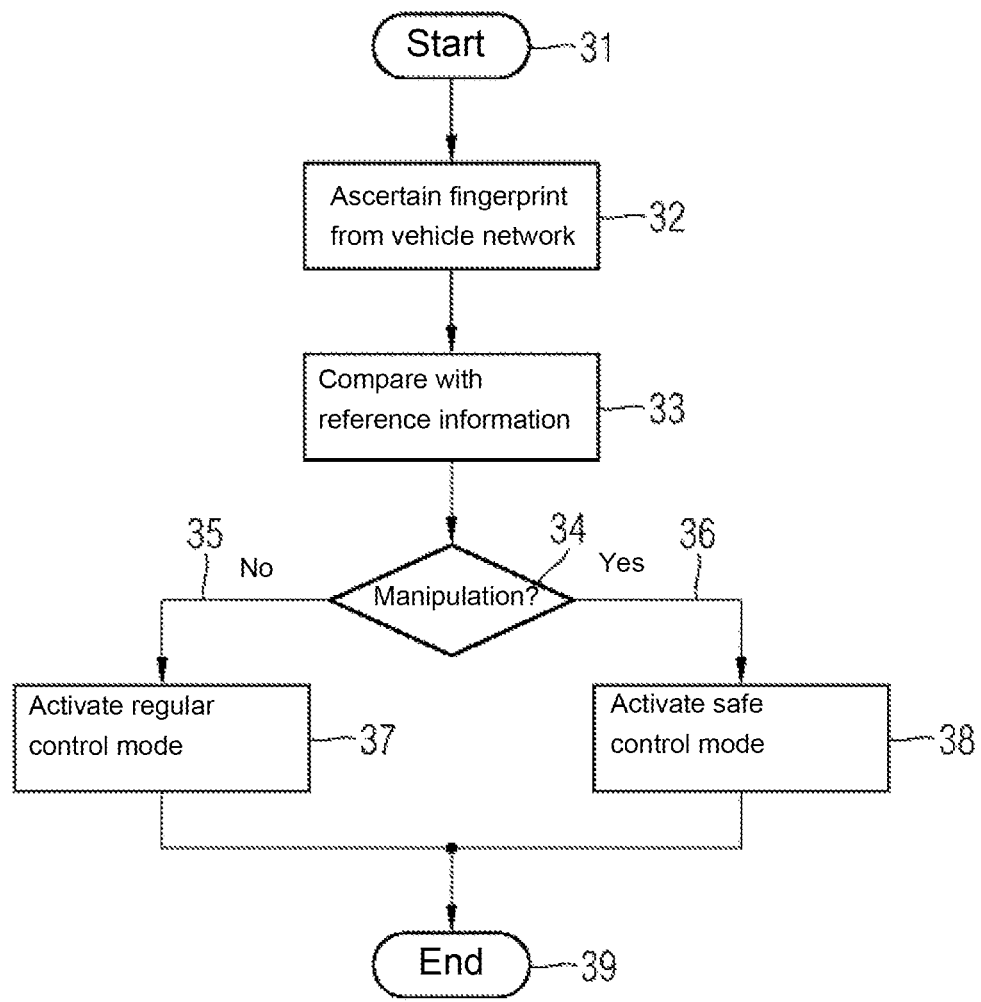
FIG. 3 shows a flowchart for the recognition of manipulation and corresponding reactions.

The reference symbols in the figures have the following specific meanings:
1 Vehicle
2 Vehicle networks/VCS vehicle control network
3 Vehicle main network bus
4 Vehicle subnetwork bus/vehicle control network bus
Vehicle subnetworks:
21 control network
22 Brake network/brake controller
23 Air-conditioning network/air-conditioning controller/HVAC control
24 Train protection network ATP
25 Passenger information network PIS-S
26 Passenger information network AIS-D
FIG. 3:
31 Start
32 Ascertainment of the fingerprint from a vehicle network
33 Comparison with reference information
34 Decision: manipulation Yes/No
35 No
36 Yes
37 activation of a regular control mode
38 Activation of a safe control mode
39 End
GW Network coupler/gateway
EK Electric coupling.

The rail vehicle depicted in FIG. 1 contains a plurality of vehicle controllers that are connected up among one another. In this case, the vehicle controller of the control network 21 takes on a guiding role as "Vehicle Control Server (VCS)" and can actuate individual subsystems/vehicle subnetworks/vehicle controllers 22-24. In this case, the subsystems include the following:
the brake controller or the brake network 22,
the air-conditioning controller or the air-conditioning network 23, HVAC, Heating, Ventilation, Air conditioning, and
the train protection controller or the train protection network 24, Automatic Train Protection, ATP.

The control network 21 of the vehicle 1 is connected to the vehicle main network bus 3 via the network coupler GW. This vehicle main network bus 3 may be an Ethernet network or an IP network or a combination thereof. An existing main network in a train is the "Ethernet Train Backbone", ETB/Ethernet/train base network, for example.

In the case of the recognition of manipulation on the vehicle control network 2, manipulation that is recognized prompts the vehicle control to be customized, i.e. the implemented control functionality. The recognition of manipulation may be implemented in the network coupler/gateway GW or as part of the "Vehicle Control Server VCS", i.e. the vehicle control network or device 21. In one variant, it is part of the train protection controller 24/"Automatic Train Protection" ATP.

In line with a further exemplary embodiment, the result of the recognition of manipulation can be transmitted to another vehicle via the vehicle main network bus 3 and an electric coupling EK. In this case, there is the option of displaying the result of the recognition of manipulation on a control desk.

FIG. 2 shows a variant in which the equipment of the rail vehicle has a relatively large number of vehicle subnetworks 21-26. These are connected via the network coupler/gateway GW.

In FIG. 2, these are the following: a control network 21, which comprises a vehicle controller as Vehicle Control Server (VCS) and also a brake controller 22 and an air-conditioning controller with an air-conditioning control network 23. In addition, a train protection network with a train protection controller 24 and also a passenger information control network with two passenger information controllers 25 PIS-S and 26 PIS-D are present.

FIG. 3 shows the flowchart for recognition of manipulation. After the start 31, what is known as a digital fingerprint is ascertained 32 for a current network. Next, the result is compared with a stored piece of reference information 33. If the result of the recognition of manipulation 34 is that there is no discrepancy in this test, that is to say that the left-hand path with the No response 35 applies, then a regular control mode is activated 37. If there is a discrepancy between a piece of reference information and an ascertained fingerprint from a vehicle network, the right-hand path with a Yes 36 is taken and a safe control mode is activated 38. Subsequently, this one procedure for the recognition of manipulation has reached the end 39.

The invention claimed is:

1. A method for detecting manipulation of at least one vehicle network of a vehicle, the method comprising the following steps:
    ascertaining a digital fingerprint of the at least one vehicle network, wherein the at least one vehicle network is selected from the group consisting of a drive network, a brake network, a train protection network, an air-conditioning control network, a door control network, a passenger information network, and a video monitoring network;
    comparing the digital fingerprint of the at least one vehicle network with reference information to determine a manipulation; and
    activating a regular control mode if no manipulation of the at least one vehicle network is detected, or activating a safe control mode if a manipulation of the at least one vehicle network is detected.

2. The method according to claim 1, which further comprises carrying out a step of adapting the at least one vehicle network using a control unit.

3. The method according to claim 1, which further comprises using stored safety functions to prevent damage when a manipulation is detected, wherein the safe control mode prevents damage to at least one entity selected from the group consisting of a person and the vehicle.

4. The method according to claim 1, which further comprises detecting a manipulation on the at least one vehicle network by using the result of the comparison of the reference information with the digital fingerprint from the vehicle network.

5. The method according to claim 4, which further comprises executing the regular control mode in a vehicle control network only if an ascertained digital fingerprint from the vehicle control network used for controlling the vehicle matches a stored piece of reference information.

6. The method according to claim 4, which further comprises prompting the at least one vehicle network to be operated in a restricted mode or deactivated to keep the vehicle in a safe state, upon a discrepancy between a recorded digital fingerprint and a piece of reference information.

7. The method according to claim 1, wherein the vehicle network is implemented as an Ethernet network, an IP network, or a combination thereof.

8. The method according to claim 1, wherein the vehicle network is a self-contained vehicle network with a fixed network configuration to simplify detection of a discrepancy from the fixed network configuration.

9. The method according to claim 8, which further comprises prompting adaptation of control of the at least one vehicle network upon a discrepancy in a comparison between a fixed piece of reference network configuration information and the digital fingerprint of at least one vehicle network to be checked.

10. The method according to claim 1, which further comprises not commencing regular operation of the vehicle upon detecting a manipulation or vandalism on the at least one vehicle network.

11. The method according to claim 1, which further comprises checking topological integrity for network cabling.

12. The method according to claim 1, which further comprises monitoring the vehicle network with physical sensors.

13. The method according to claim 1, which further comprises evaluating physical transmission parameters and comparing the physical transmission parameters with reference values.

14. The method according to claim 1, which further comprises detecting extraneous devices in the vehicle network.

15. The method according to claim 14, which further comprises protecting an identifier of a device by using a cryptographic key.

16. The method according to claim 1, which further comprises storing a currently available fingerprint of the vehicle network as a new fingerprint of the vehicle network.

17. The method according to claim 1, which further comprises carrying out manipulation recognition constantly or at selected times or for selected events or for selected operating states.

18. The method according to claim 1, which further comprises monitoring individual vehicle subnetworks.

19. A network, comprising:
a plurality of networks disposed on a vehicle, said plurality of networks including a control network with a control unit and at least one vehicle network selected from the group consisting of: a drive network, a brake network, a train protection network, an air-conditioning control network, a door control network, a passenger information network, and a video monitoring network;
said control unit configured to compare a digital fingerprint from said at least one vehicle network with reference information from said control network to determine a manipulation, wherein said control unit is a computer; and
said control unit configured for activating a regular control mode if no manipulation of the at least one vehicle network is detected, and for activating a safe control mode if a manipulation of the at least one vehicle network is detected.

20. The network according to claim 19, wherein said control unit is configured to perform a self-check.

21. The network according to claim 19, wherein said control unit is configured to enable, restrictedly enable or deactivate at least one controller for a regular operation.

22. The network according to claim 19, wherein said a control computer is configured to limit admissible communication through a network coupler/gateway to couple a plurality of vehicle networks.

23. The network according to claim 19, wherein said control unit is configured to switch off an alarm message indicating detection of a manipulation and to commence regular operation.

24. The network according to claim 19, which further comprises an error memory configured to store check results.

25. The network according to claim 19, which further comprises a standard mobile radio network interface configured to transmit data communication for detection of manipulation to a land-based unit.

26. The network according to claim 19, which further comprises a network coupler/gateway interconnecting a plurality of vehicle networks or vehicle subnetworks.

27. The method according to claim 1, wherein the fingerprint includes information selected from the group consisting of a number, a type and an identity of components connected to the vehicle network.

28. The network according to claim 19, wherein the fingerprint includes information selected from the group consisting of a number, a type and an identity of components connected to the vehicle network.

* * * * *